Figure 1:
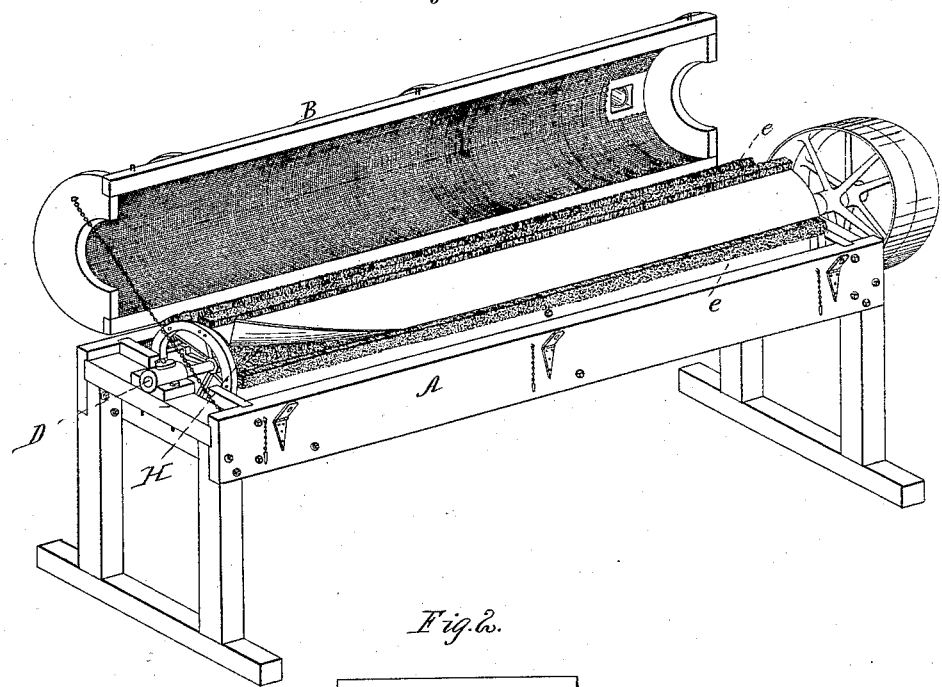

(No Model.) 3 Sheets—Sheet 1.

D. L. SHOEMAKER.
MACHINE FOR CLEANING AND SCOURING RICE AND OTHER GRAIN.

No. 306,183. Patented Oct. 7, 1884.

Witnesses:  
W. C. Jordiston

Inventor:  
David L. Shoemaker  
by Melville Church  
his Attorney.

(No Model.) 3 Sheets—Sheet 2.
D. L. SHOEMAKER.
MACHINE FOR CLEANING AND SCOURING RICE AND OTHER GRAIN.
No. 306,183. Patented Oct. 7, 1884.
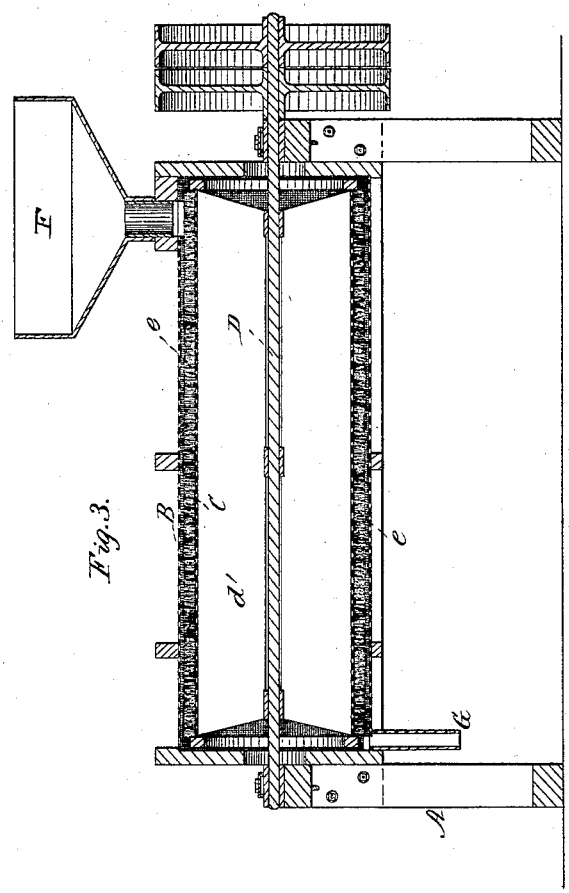

(No Model.) 3 Sheets—Sheet 3.
D. L. SHOEMAKER.
MACHINE FOR CLEANING AND SCOURING RICE AND OTHER GRAIN.
No. 306,183. Patented Oct. 7, 1884.
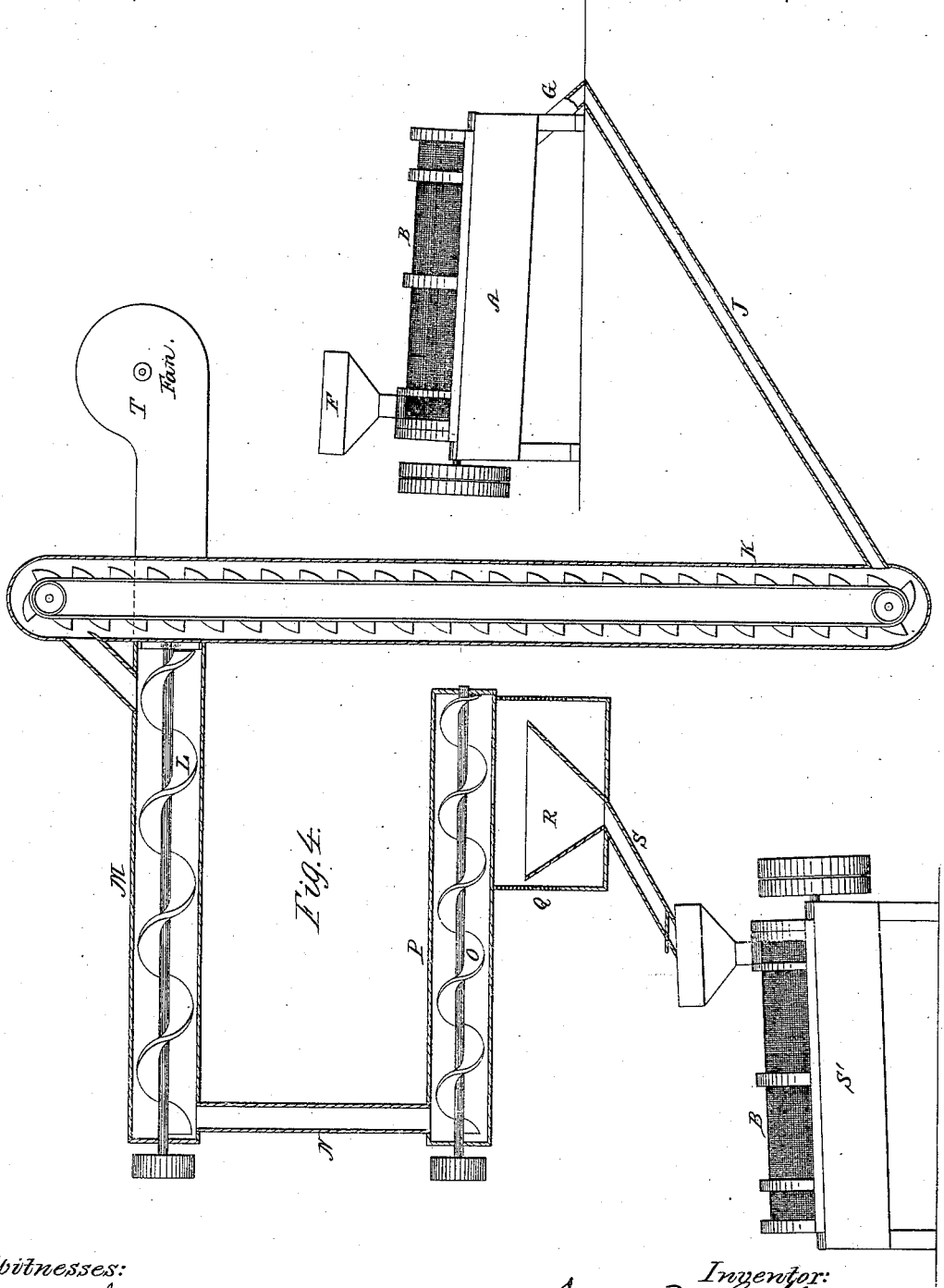

UNITED STATES PATENT OFFICE.

DAVID L. SHOEMAKER, OF WASHINGTON, DISTRICT OF COLUMBIA, ASSIGNOR TO JOHN HUGHES, OF NEW BERNE, NORTH CAROLINA, MARIE F. SYLVESTER, OF BOSTON, MASSACHUSETTS, AND BENSON TALBOTT, OF MONTGOMERY COUNTY, MARYLAND.

MACHINE FOR CLEANING AND SCOURING RICE AND OTHER GRAIN.

SPECIFICATION forming part of Letters Patent No. 306,183, dated October 7, 1884.

Application filed October 8, 1883. (No model.)

*To all whom it may concern:*

Be it known that I, DAVID L. SHOEMAKER, of the city of Washington, in the District of Columbia, have invented certain new and useful Improvements in Machines for Cleaning and Scouring Rice and other Grain; and I do hereby declare the following to be a full, clear, and exact description of the same, reference being had to the accompanying drawings, forming part of this specification, and to the figures and letters of reference marked thereon.

My present invention consists in certain novel improvements upon the invention shown and described in Letters Patent of the United States, No. 255,343, granted to me on the 21st of March, 1882, and will be hereinafter fully described and specifically claimed. In my aforesaid patented invention I employed a horizontal outer cylindrical screen in connection with a horizontal inner revolving cylinder armed with longitudinal brushes adapted to project in close proximity to the outer cylindrical screen, and I supplied means for forcing currents or blasts of air from the inner cylinder outward through the outer screen. The rice was passed through this machine between the cylinders thereof for the purpose of removing the outer skin or douce, and was then passed through another machine termed a "polisher" similar to the scouring-machine just described, except that in lieu of the outer screen an outer cylinder of fine wire, leather or raw-hide was employed. In the practical operation of the said patented invention it has been found that the action of the first machine so heats the rice as to render it necessary to spread it out and allow it to cool before passing it through the second machine, for if delivered immediately to the second machine without cooling it will, from its heated and consequently brittle condition, be broken to such an extent as to largely increase the amount of the unmerchantable article. It has also been found that in order to give the rice that beautiful pearly appearance that so enhances its market value, it is necessary with the old construction to pass it several times through the polisher, this operation requiring additional time and labor, and tending also to increase the quantity of the broken rice. Noting these things, I have contrived to so improve the machines as to render each one a polisher as well as a scourer, and enabled the rice to be thoroughly cleaned and polished by a single passage through the machine.

Figure 2:
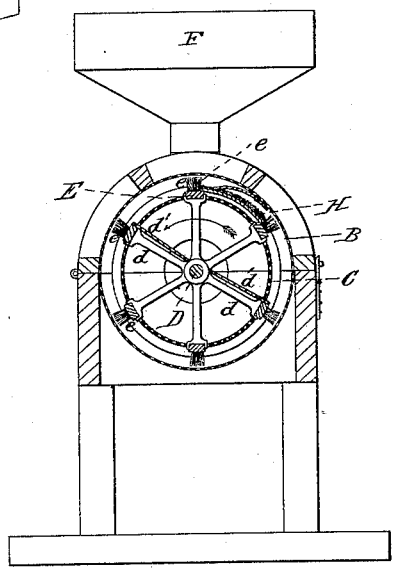

Referring to the accompanying drawings, Figure 1 represents a perspective view of one of the machines with the upper half or section of the outer cylinder thrown back. Fig. 2 is a transverse sectional view. Fig. 3 is a longitudinal sectional view of the same; and Fig. 4 is a view showing two machines with conveying and cooling devices arranged between them.

Similar letters of reference in the several figures denote the same parts.

A represents the frame of the machine; B, the outer cylinder or screen, and C the inner cylinder or screen.

The outer screen, B, is constructed, as in the former patented machine, of wire-cloth, and for convenience is divided longitudinally into two halves or sections, which are hinged together, as shown, so that the upper section can be opened or closed at pleasure. By preference I employ for the upper half or section wire-cloth having ten to twelve meshes to the square inch, and for the lower half or section I employ wire-cloth of finer mesh—that is to say, twelve to fourteen meshes to the square inch. A shaft, D, extends longitudinally through the outer screen, and is provided with radial arms $d$, to which are secured brush-strips E, and to these brush-strips are attached the sections of wire-cloth which go to make up the inner cylinder, C. The wire-cloth composing the inner cylinder has a mesh fine enough to prevent the broken rice passing through.

To the series of longitudinal brush-strips E are secured a series of brushes, $e$, and to two opposite radial arms, $d$, are secured two fan-blades, $d'$, as shown. Openings are made in one or both end casings (preferably both) for the admission of air to the inner cylinder. Over one, two, or more of the sections of the inner cylinder I secure sheep-skin H, with wool side out, and over such sheep-skin I place a flap of leather, preferably such as is known to the trade as "basil leather," and secure one edge of the leather flap to one of the adjoining brush-strips, leaving the other edge free.

To operate a machine thus constructed, the feed end of the machine is elevated somewhat, and the shaft D, carrying the fan-blades, inner cylinder, and brushes, is put into rapid rotation in the direction indicated by the arrows in Fig. 2. The hulled rice to be cleaned is then fed in through a feed spout or hopper, F, at the upper end of the machine, and, passing down in between the inner and outer cylinders, partakes of the motion of the inner cylinder, and is carried round and round by the brushes and kept in contact with the outer screen by centrifugal force and by the outward yielding pressure of the flaps of basil leather, thus scouring off the douce or skin and giving the grains a polish, the douce or skin being forced by the air-blast out through the meshes of the outer screen into the open air or into a trunk or chamber, from which it is conveyed away to a suitable place of deposit. Owing to the close proximity of the inner cylinder and outer screen to each other, there is no opportunity for the rice to be thrashed about and broken up, but it is gradually scoured and polished and discharged from a spout, G, at the lower end of the machine.

If the rice as it comes from the machine is not sufficiently cleaned or polished, it may, after cooling sufficiently, be passed again through the same machine; but in order to avoid the delay requisite for cooling as commonly practiced, I have found it advantageous to employ a second machine of the same or similar construction with intermediate cooling and conveying mechanism of well-known construction, whereby the rice may be automatically transported from the one to the other and cooled in transit. This may be accomplished by causing the rice as it is delivered from the first machine to pass into a chute, J, by which it is directed to an elevator, K, and carried up by the latter and delivered to a conveyer, L, operating within a closed trunk, M. From the delivery end of the conveyer L it proceeds down a spout, N, to a second conveyer, O, operating within a second closed trunk, P, and from the latter it is discharged through an open-sided chamber, Q, into a hopper, R, and thence through a chute, S, to and through the second machine or polisher, S'. A blast of air is forced by a suitable fan, T, through the conveyer-casing M, spout N, and second conveyer-casing, O, and operates to thoroughly cool the rice before it is delivered to the second machine, S'.

In these scouring and polishing machines the raising of the upper or feed end is essential, as otherwise the rice will not pass through the machine.

I have found from careful practical tests that excellent results can be obtained from machines in which the outer cylinder of each is six feet long and seventeen inches in diameter; the inner cylinder five feet long and thirteen inches in diameter; the brushes five or six in number, with bristles one and one-half inch long, so as to leave a clear space of about one-quarter of an inch between their ends and the interior of the outer cylinder; fan-blades two in number on opposite sides of the shaft; and two or three basil-leather flaps with sheep-skin backing applied, as hereinbefore described. To obtain the best results from such machines, about five hundred revolutions a minute should be given the shaft, and the feed end should be elevated about fourteen inches. The proportions of the parts and the speed of the machines can of course be varied from these here given without departing from the spirit of my invention; but excellent, and perhaps the best, results are to be attained when the proportions given are substantially adhered to. The basil-leather flaps, by reason of their soft yielding backing, press the rice with yielding pressure against the interior of the outer cylinders and impart to the rice a high polish without breaking it. Any other suitable yielding backing may be substituted for the sheep-skin, but I recommend its use.

From actual test I have ascertained that a single operation of my improved machines upon a given quantity of rice will result in the yield of a larger proportion of what is known as "head" or "line" rice than would result from the same quantity acted upon by the old patented machines, while the pearly color given the rice by being passed through the machines once could not be produced by less than three successive polishings in a polisher of the old construction.

I claim as my invention—

In a machine for cleaning and scouring rice and other grain, the combination, substantially as described, of an outer cylindrical screen, an inner revolving cylinder armed with longitudinal brushes, which project in close proximity to the outer cylindrical screen, and also with one or more flexible flaps secured at one edge between the brushes and having a yielding backing, and means for forcing currents of air from the inner revolving cylinder out through the outer screen.

DAVID L. SHOEMAKER.

Witnesses:
MELVILLE CHURCH,
FRED F. CHURCH.